United States Patent

[11] 3,625,936

[72] Inventors Fritz Meininger;
Hartmut Springer, both of Frankfurt am Main, Germany
[21] Appl. No. 750,783
[22] Filed Aug. 7, 1968
[45] Patented Dec. 7, 1971
[73] Assignee Farbwerke Hoechst Aktiengesellschaft vormals Meister Lucius & Bruning Frankfurt am Main, Germany
[32] Priority Aug. 12, 1967
[33] Germany
[31] P 16 44 225.4

[54] AZOPHTHALOCYANINE DYESTUFFS AND PROCESS FOR PREPARING THEM
6 Claims, No Drawings
[52] U.S. Cl................................................... 260/147,
8/4, 8/13, 8/41 B, 8/42 R, 8/42 B, 8/50, 8/51,
117/138.8 R, 117/142, 117/144, 260/37 N,
260/146 R, 260/152, 260/162, 260/163, 260/199,
260/207, 260/207.1, 260/249.6, 260/249.8,
260/314.5, 260/507 R, 260/510, 260/544 L,
260/556 AR, 260/557 R
[51] Int. Cl...................................................C09b 45/14,
C09b 47/04, D06p 1/10
[50] Field of Search.......................................... 260/146, 147

[56] References Cited
UNITED STATES PATENTS
| | | | |
|---|---|---|---|
| 3,133,050 | 5/1964 | von Tobel..................... | 260/146 |
| 3,278,516 | 10/1966 | Scherer et al................ | 260/147 X |
| 3,278,549 | 10/1966 | Scherer et al................ | 260/146 X |
| 3,360,505 | 12/1967 | Scherer et al................ | 260/147 |
| 3,360,509 | 12/1967 | Scherer et al................ | 260/147 X |
| 3,360,524 | 12/1967 | Scherer et al................ | 260/147 X |
| 3,445,449 | 5/1969 | Meininger et al............ | 260/147 |
| 3,489,741 | 1/1970 | Grimmel..................... | 260/146 |

*Primary Examiner*—Floyd D. Higel
*Attorney*—Curtis, Morris & Safford

ABSTRACT: Water-soluble azophthalocyanine dyestuffs of the formula (1)

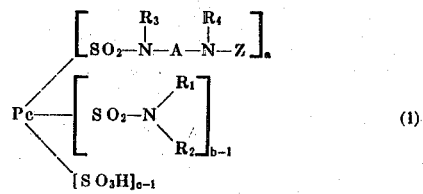

in which Pc represents phthalocyanine, tetraphenylphthalocyanine, tetrachlorophthalocyanine or the copper, cobalt or nickel compound thereof, A represents the radical —D—N=N—K— or —K—N=N—D—, in which D represents the radical of a diazo component of the benzene, naphthalene, diphenyl, diphenylether or stilbene series, and K the radical of a coupling component of the benzene, naphthalene, acetylacetacidarylamide or pyrazolone series, $R_1$ and $R_2$ each represents hydrogen or alkyl or aryl or together with the nitrogen atom an alkylene-imine ring, $R_3$ and $R_4$ each represents hydrogen or alkyl from one to four carbon atoms, a, b and c represent integers from one to four, the sum of which being at most six, and Z represents the grouping of the formula (2)

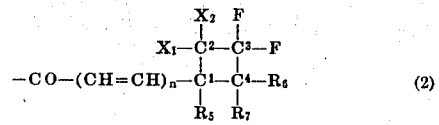

or the grouping of the formula (3)

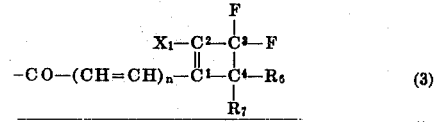

wherein $R_5$, $R_6$ and $R_7$ stand for hydrogen, chlorine, hydroxyl, alkyl, alkoxy, phenyl, phenoxy, cyano, nitro, sulfonic acid, carboxylic acid alkyl ester, N-monoalkylsulfonic acid amide, N-dialkylsulfonic acid, alkylsulfonyl, phenylsulfonyl, N-monoalkyl carboxylic acid amide or N-dialkylcarboxylic acid amide group, or $R_5$ and $R_7$ a double linkage between $C^1$ and $C^4$, $X_1$ and $X_2$ represent halogen atoms, and n represents the integer 0 or 1, said dyestuffs being suitable for the dyeing or printing of fibrous materials consisting of native or regenerated cellulose, wool, silk or polyamides as well as leather, the dyeings or prints obtained on the said fibrous materials being distinguished by high tinctorial strength and by a very good fastness to wet processing and to light.

AZOPHTHALOCYANINE DYESTUFFS AND PROCESS FOR PREPARING THEM

The present invention relates to novel water-soluble azophthalocyanine dyestuffs of the general formula (1)

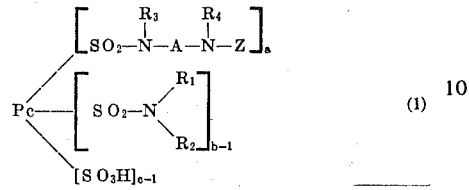

(1)

in which Pc represents a phthalocyanine radical which may be substituted and which preferably contains a metal, for example copper, cobalt or nickel, A represents an azo-dyestuff radical of the formula —D—N=N—K— or —K—N=N—D—, in which D represents the radical of a diazo component, preferably of the benzene, naphthalene-, diphenyl-, diphenyl ether- and stilbene series, and K represents the radical of a coupling component, preferably containing hydroxy- or amino groups and derived from the benzene-, naphthalene-, acetoacetic acid arylamide- and pyrazolone series, which radicals may both contain water-solubilizing groups such as sulfonic acid- or carboxylic acid groups, $R_1$ and $R_2$ each represents a hydrogen atom or an alkyl- or aryl group which may be substituted, or form together with the nitrogen atom an alkylene-imine ring, $R_3$ and $R_4$ each represents a hydrogen atom or an alkyl group having one to four carbon atoms, $a$, $b$ and $c$ are integers of from 1 to 4, their sum being at most 6 and Z represents a grouping of the formula (2) or a grouping of the formula (3)

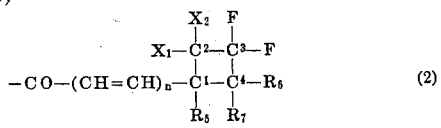

(2)

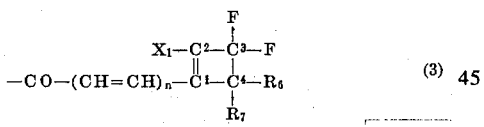

(3)

in which $R_5$, $R_6$ and $R_7$ each represents a hydrogen or chlorine atom or a hydroxyl-, alkyl, alkoxy-, phenyl-, phenoxy-, cyano-, nitro-, sulfonic acid-, carboxylic acid alkyl ester-, N-alkyl- or N-dialkyl-sulfonic acid amide-, alkyl-sulfonyl-, phenylsulfonyl- or N-alkyl- or N-dialkyl-carboxylic acid amide group, or $R_5$ and $R_7$ represent another linkage between the carbon atoms $C^1$ and $C^{4}$. $X_1$ and $X_2$ each represents a halogen atom, preferably a fluorine or chlorine atom, and $n$ is 0 or an integer of 1, and processes for preparing them.

The novel azophthalocyaline dyestuffs of the above general formula (1) may be prepared by coupling (a) diazo compounds of amines of the general formula (4)

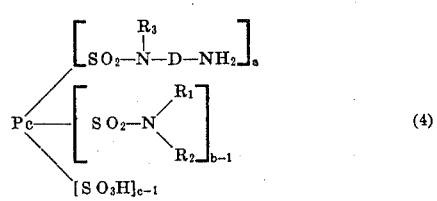

(4)

in which Pc, D, $R_1$, $R_1$, $R_3$, $a$, $b$ and $c$ have the above meanings, with coupling components of the general formula (5)

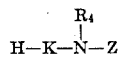

(5)

in which $R_4$ and Z have the above meaning or (b) coupling components of the general formula (6)

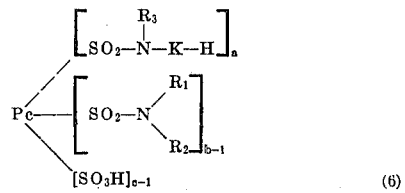

(6)

in which Pc, K, $R_1$, $R_2$, $R_3$, $a$, $b$ and $c$ have the meanings given above, with diazo compounds of amines of the general formula (7)

(7)

in which D, $R_4$ and Z have the above meanings, in an aqueous or aqueous-organic medium within a pH range of from about 3 to about 10, preferably from about 5 to about 8.5.

The optimum temperature to be applied in coupling in each individual case and the advantageous pH-range to be maintained depend on the reaction components used. Whether the diazo- and coupling components are to be combined in a purely aqueous medium or in an aqueous-organic medium, depends likewise on the properties of the starting materials, for example on their solubility.

The above-specified diazo compounds of amines of the general formulas (4) or (7) to be used as starting materials for the process of the present invention, are obtainable from the basic amines of the formulas (4) or (7) by methods known per se, for example by a treatment with sodium nitrite in the presence of mineral acids, especially hydrochloric acid. Moreover, the diazotization may be effected by means of nitrosyl-sulfuric acid or in the presence of α-naphthalene-sulfonic acid.

The diazotizable amines of the formula are obtained in known manner by reacting phthalocyanine-sulfonic acid chlorides with amines of the general formula (8)

(8)

in which $R_3$ and D have the meanings given further above and Y represents an amino group or a group that is convertible into an amino group, for example an acetylamino- or a nitro group which are transformed into amino groups by a subsequent saponification or reduction. In the case of $b$ being unequal 1, the phthalocyanine sulfonic acid chlorides are condensed with the amines of the formula (8) with the addition of amines of the general formula (9)

(9)

in which $R_1$ and $R_2$ have the meanings given further above. In the case of $c$ being unequal 1, condensation is either effected by simultaneously saponifying part of the sulfonic acid chloride groups or with an amount of amines of the formulas (8) and (9) that is not yet sufficient for a complete reaction of all sulfonic acid chloride groups and then saponifying the remainder of the sulfonic acid chloride groups in a special reaction step.

As examples of appropriate compounds of the formula (8) there may be mentioned 1,3-diaminobenzene, 1,4-diaminobenzene, 1-amino-3-acetaminobenzene, 1-amino-4-acetaminobenzene, 1,3-diaminobenzene-4-sulfonic acid, 1,4-diaminobenzene-2-sulfonic acid, 1,3-diaminobenzene-4-carboxylic acid, 1-amino-3-acetaminobenzene- 4-carboxylic acid, 1,4-diaminobenzene-2- carboxylic acid, 1-amino-4-acetaminobenzene-3-carboxylic acid, 2,4-diamino-1-chlorobenzene, 2,5-diamino-1-chlorobenzene, 4-amino-2-acetamino-1-chlorobenzene, 3-nitrobenzylamine, 4-nitrobenzylamine, 2-methoxy-5-nitrobenzylamine, 4-methoxy-3-nitrobenzylamine, 2-methyl-5-nitrobenzylamine, 4-methyl-3nitrobenzylamine 2-chloro-5-nitrobenzylamine, 4-chloro-3-nitrobenzylamine, 3-amino-4-methoxybenzylamine, 3-amino-4methylbenzylamine, 3-amino-4-chlorobenzylamine, N-methyl-3-nitro-benzylamine, N-methyl-4-nitrobenzylamine, N-(4-nitrophenyl)-ethylenediamine, N-(4-nitro-2-sulfophenyl)-ethylenediamine, N-(4-aminophenyl)-piperazine, N-(4-nitrophenyl)-piperazine, N-(4-nitro-2-sulfophenyl)-piperazine, β-(4-nitrophenyl)-ethylamine, benzidine, benzidine-3-sulfonic acid, 2-nitro-4-aminophenol, 3-amino-2-chloro-benzylamine-5-carboxylic acid, 4,4′-diamino-diphenyl ether-2,5-disulfonic acid, 1-amino-4-acetamino-naphthalene-6-sulfonic acid, 4,4′-diaminostilbene-2,2′-disulfonic acid, 2-amino-6-(3-nitrobenzoylamino)-toluene-4-sulfonic acid, 2,6-diamino-toluene-4-sulfonic acid, as well as the following compounds of the formulas

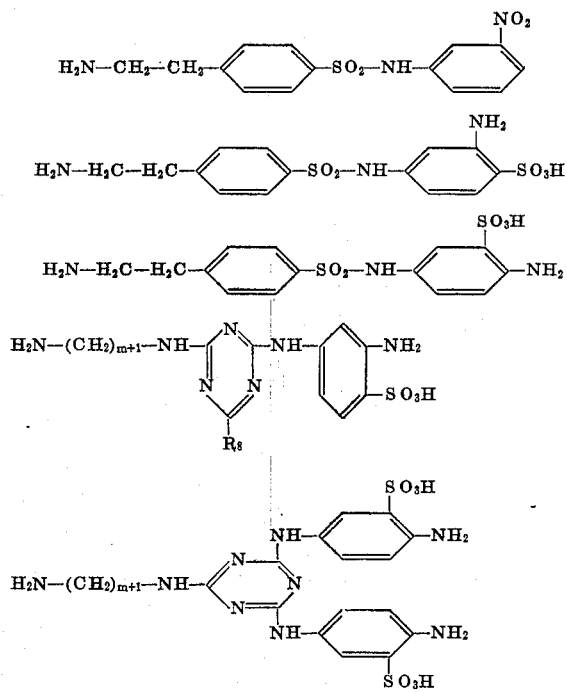

and

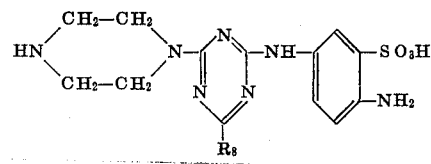

in which formulas m stands for an integer of from 1 to 6 and $R_8$ represents an amino group or an etherified hydroxy- or mercapto group or especially the radical of an organic amine which may be substituted. The above-specified amines may be prepared by methods known per se for the preparation of such compounds (cf. French Pat. No. 1,441,218).

As phthalocyanine sulfonic acid chlorides to be used for the preparation of the phthalocyanine compounds of the formula (4) there may be mentioned, for example, sulfonic acid chlorides of metal-free phthalocyanine; preferably sulfonic acid chlorides of metal-containing phthalocyanines, for example copper-phthalocyanine-(3)-tetrasulfonic acid chloride, copper-phthalocyanine-(3)-trisulfonic acid chloride, copper-phthalocyanine-(3)-disulfonic acid chloride, nickel-phthalocyanine-(3)-tetra-sulfonic acid chloride, cobalt-phthalocyanine-(3)-trisulfonic acid chloride, copper-phthalocyanine-(4)-disulfonic acid chloride or copper-phthalocyanine-(4)-tetrasulfonic acid chloride. Sulfonic acid chlorides which carry further substituents at the phthalocyanine nucleus, for example sulfonic acid chlorides of tetraphenyl-copper-phthalocyanine or tetrachloro-nickel-phthalocyanine or copper-phthalocyanine-(3)-disulfonic acid chloride disulfonic acid, are also appropriate. The specified sulfonic acid chlorides are prepared by known methods, for example by the process disclosed in German Pat. No. 891,121.

Examplary of amines of the formula (9) which may be used for the preparation of the phthalocyanine starting dyestuffs of the formula (4), are the following compounds:

Ammonia, methylamine, ethylamine, n-butylamine, benzylamine, aniline, ethanolamine, dimethylamine, diethylamine, diisopropylamine, N-methylbenzylamine, N-methylaniline, piperidine, morpholine, diethanolamine, 2-aminoethane-1-sulfonic acid, 2-aminoethane-1-carboxylic acid, 4-aminobenzene-carboxylic acid, 3-aminobenzene-sulfonic acid or 4-aminobenzene-sulfonic acid.

As coupling components of the formula (5) suitable for the process of the invention there are mentioned, for example, compounds which are capable of coupling with the above-specified diazo compounds of amines of the formula (4), owing to the presence of a hydroxy- or amino group linked to an aromatic nucleus. The selected group of the specified coupling components, for example, comprises the following compounds which may be used in the form of their alkali metal salts: 1-[m-(β-2′, 2′, 3′, 3′tetrafluorocyclobutyl-acryloylamino) -5-pyrazolone-3-carboxylic acid of the formula

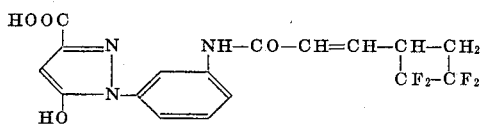

1-[m-(2′, 2′-dichloro-3′, 3′-difluorocyclobutyl-carbonylamino)-phenyl]-5-pyrazolone-3-carboxylic acid of the formula

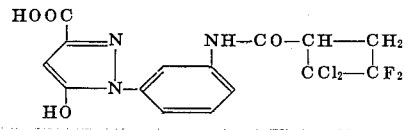

1-[p-(2′-chloro-3′, 3′-difluorocyclobutene-1′-yl-carbonylamino)-phenyl]-5-pyrazlone-3-carboxylic acid of the formula

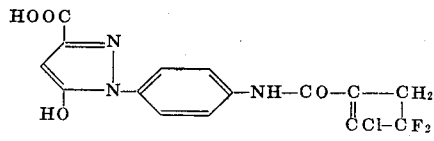

1-(β-2′, 2′, 3′, 3′-tetrafluorocyclobutyl-acryloylamino)-8-hydroxy-naphthalene-3,6-disulfonic acid of the formula

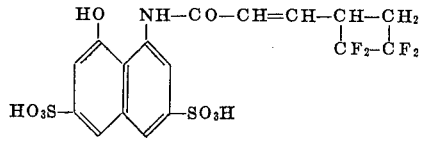

1-(1′-chloro-2′, 2′, 3′, 3′-tetrafluorocyclobutyl-carbonylamino)-8-hydroxynaphthalene-3,6-disulfonic acid of the formula

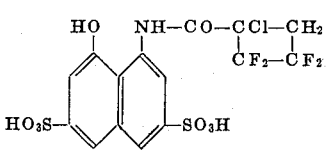

2-(β-2', 2', 3', 3'-tetrafluorocyclobutyl-acryloyamino)-8-hydroxy-naphthalene-6-sulfonic acid of the formula

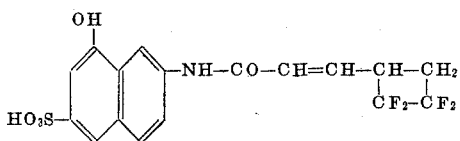

2-(β-2', 2', 3', 3'-tetrafluorocyclobutyl-acryloylamino)-5-hydroxy-naphthalene-7-sulfonic acid and 2-[N-methyl-N-(2'-chloro-2', 3', 3'-trifluorocyclobutyl-carbonyl)-amino]-5-hydroxynaphthalene-7-sulfonic acid of the formula

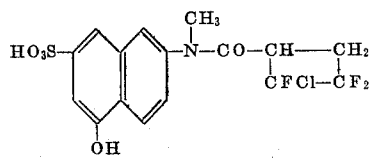

As appropriate phthalocyanine compounds of the formula (6) capable of coupling, there may be mentioned, for example, compounds in which the radical K represents a radical of the benzene-, naphthalene-, pyrazolone- or acetoacetic acid aryl amide series that has a point capable of coupling. The compounds are prepared by methods known per se, for example by reacting phthalocyanine sulfonic acid chlorides specified further above with amines of the general formula (10)

in which K and $R_3$ have the meanings mentioned further above, and, if required, with amines of the general formula (9) while if desired, saponifying part of the sulfonic acid chloride groups simultaneously or subsequently.

As amines of the formula (10) there are used primary and secondary amines of the benzene-, napthalene-, pyrazolone- or acylacetic acid arylamide series, which contain in the molecule at least one point capable of coupling, such as amino-phenols, amino-naphthols aminoapthol-carboxylic acid amides, aminonaphthol sulfonic acids, aminoaryl-pyrazlones and acylacetic acid arylamides containing amino groups. Exemplary of such amides of the formula (10) are the following: 1-amino-3-hydroxybenzene, 1-amino-3-hydroxy-benzene-4-carboxylic acid, 1-amino-3-dimethylaminobenzene, 1-amino-7-hydroxynaphthalene, 2-amino-5-hydroxynaphthalene-7-sulfonic acid, 2-amino-8-hydroxynaphthalene-6-sulfonic acid, 1-amino-8-hydroxynaphthalene-3,6-disulfonic acid, 1-(3'-aminophenyl)-3-methyl-5-pyrazlone, 1-(4'-aminophenyl)-3-methyl-5-pyrazolone, 1-(3'-amino-2'-methyl-5'-sulfophenyl)-3-methyl-5-pyrazlone, 1-(3'-aminophenyl)-5-pyrazolone-3-carboxylic acid, 1-(4'-amino-2', 2''-disulfostilbene)-3-methyl-5-pyrazolone, 1-(4-amino-2''-sulfodiphenyl)-3-methyl-5-pyrazolone.

As aromatic amines of the formula (7) there may be mentioned the following compounds:
1-(2', 2'-dichloro-3', 3'-difluoro-cyclobutyl-carbonylamino)-3-aminobenzene-5-sulfonic acid, 1-(1', 2', 2'-trichloro-3', 3'-difluorocyclobutyl-carbonylamino)-2-methyl-5-aminobenzene-4-sulfonic acid, 1-(2'-chloro-3', 3-difluoro-cyclobuten-1-yl-carbonylamino)-2-methyl-5-amino-benzene-3-sulfonic acid, 1-(2', 2'-dichloro-3', 3'-difluorocyclobutyl-carbonylamino)-2-methyl-3-aminobenzene-5-sulfonic acid, 2-chloro-1(2'-chloro-3', 3'-difluorocyclobutene-1-yl-carbonylamino)-3-aminobenzene-5-sulfonic acid, 6-nitro-1-(1', 2', 2'-trichloro-3', 3'-difluorocyclobutyl-carbonylamino)-3-aminobenzene-4-sulfonic acid, 2-chloro-1-(2', 2'-dichloro-3', 3'-difluorocyclobutyl-carbonylamino)-4-aminobenzene-6-sulfonic acid, 1-(β-2', 2', 3', 3'-tetrafluorocyclobutyl-acryloylamino)-3-aminobenzene-4-sulfonic acid and 1-(β-2', 2', 3', 3'-tetrafluorocyclobutyl-acryloylamino)-3-aminobenzene-4-carboxylic acid.

The starting compounds necessary for carrying out the process of the present invention are advantageously chosen in such a manner that the azo-phthalocyanine dyestuffs of the general formula (1) obtained contain such a number of water-solubilizing groups, for example, sulfonic acid- and/or carboxylic acid groups, as is necessary to achieve sufficient solubility in water. The novel azo phthalocyanine dyestuffs of the general formula (1) may be also prepared by reacting azo-phthalocyanine dyestuffs containing amino groups and corresponding to the general formula (11)

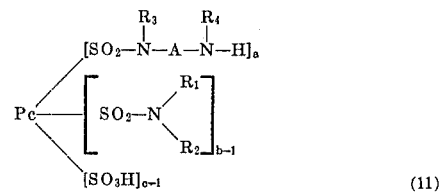

(11)

in which Pc, A, $R_1$, $R_2$, $R_3$, $R_4$, a, b and c have the meanings given further above, with acid chlorides of the formula Z—Cl, Z representing a group of the formula (2) or a group of the formula (3), at temperatures in the range of from about 0° C. to about 80° C., preferably from about 10° C. to about 30° C., in an aqueous-organic medium within a pH-range of from about 2 to about 10 in the presence of an acid-binding agent.

The starting compounds necessary for carrying out this process are advantageously chosen in such a manner that the azo-phthalocyanine dyestuffs of the general formula (1) obtained contain such a number of water-solubilizing groups, for example sulfonic acid- and/or carboxylic acid groups, as is necessary to achieve sufficient solubility in water.

The azophthalocyanine dyestuffs of the formula (11) mentioned which contain amino groups and which are used as starting materials, can be obtained by methods known per se, for example be reacting phthalocyanine sulfonic acid chlorides with amino-azo dyestuffs of the general formula (12)

(12)

in which A and $R_3$ have the meanings given further above and Y represents an amino group or a group convertible into an amino group, for example an acetylamino- or nitro group which are transformed into amino groups by a subsequent saponification or reduction. In the case of b being unequal 1, the phthalocyanine sulfonic acid chlorides are condensed with the amino-azo dyestuffs of the formula (12) with the addition of amines of the general formula (13)

(13)

in which $R_1$ and $R_2$ have the meanings given further above. In the case of c being unequal 1, condensation is effected by simultaneously saponifying part of the sulfonic acid chloride groups, or with an amount of amines of the formulas (12) and (13), that is not sufficient for the complete conversion of all sulfonic acid chloride groups and then saponifying the remainder of the sulfonic acid chloride groups in a special reaction step.

Exemplary of appropriate amino-azo dyestuffs of the formula (12) are the following compounds:

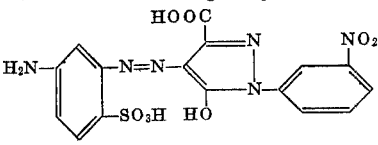

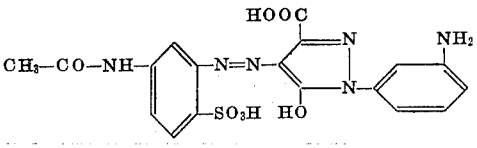

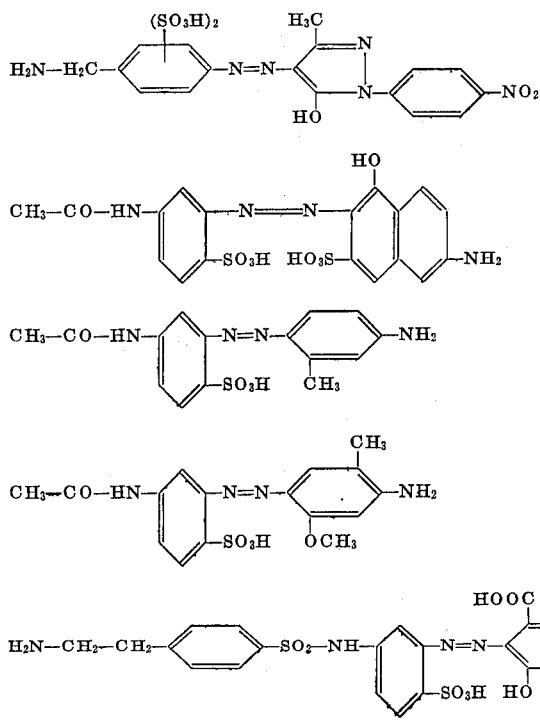

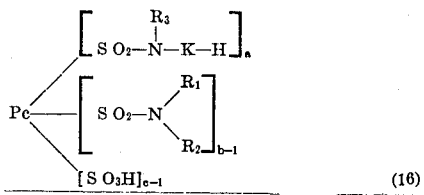

Exemplary of amines of the formula (13) which may be used for the preparation of the phthalocyanine starting dyestuffs of the formula (11), are, for example, the following compounds:

Ammonia, methylamine, ethylamine, n-butylamine, benzylamine, aniline, ethanolamine, dimethylamine, diethylamine, diisopropylamine, N-methylbenzylamine, N-methylaniline, piperidine, morpholine, diethanolamine, 2-aminoethane-1-sulfonic acid, 2-aminoethane-1-carboxylic acid, 4-aminobenzene-carboxylic acid, 3-aminobenzene sulfonic acid or 4-aminobenzene-sulfonic acid.

The azo-phthalocyanine dyestuffs of the formula (11) may furthermore be prepared by coupling diazo compounds of amines of the general formula (14)

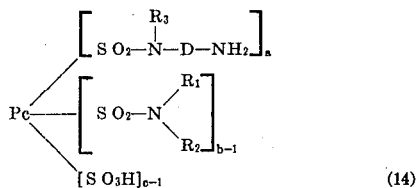

in which Pc, D, $R_1$, $R_2$, $R_3$, $a$, $b$ and $c$ have the above meanings, with coupling components of the formula (15)

in which K and $R_4$ have the above meanings, or by coupling, for example, coupling components of the general formula (16)

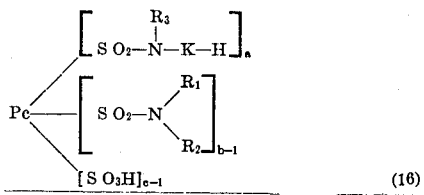

in which Pc, K, $R_1$, $R_2$, $R_3$, $a$, $b$ and $c$ have the above meanings, with diazo compounds of amines of the formula (17)

in which D and $R_4$ have the above meanings. Coupling components of the formula (15), which are used for the preparation of azo-phthalocyanine dyestuffs containing amino groups and corresponding to the formula (11) mentioned, are for example amines of the benzene- or naphthalene series which are capable of coupling owing to the presence of a primary or secondary amino group or a phenolic hydroxy group; furthermore pyrozolone derivatives capable of coupling owing to the presence of an enolizable keto-methylene grouping. Coupling components of the type mentioned are, for example, N-methyl-aniline-ω-sulfonic acid, m-toluidine, 1-amino-3-methoxybenzene, 1-amino-3-methyl-6-methoxybenzene, N-monoacyl derivative of 1,3-diaminobenzene, 1,3-diaminobenzene-4-sulfonic acid, 1-aminonaphthalene-6- or -7-sulfonic acid, 1-amino-8-oxynaphthalene-3,6- or -4,6-disulfonic acid, 2-amino-8-oxynaphthalene-6-sulfonic acid and 2-amino-5-oxynaphthalene-7-sulfonic acid, furthermore 1-(3'- or 4'-amino)-phenyl-3-methyl-5-pyrazolone, 1-(3'-amino-2'-methyl-5'-sulfophenyl)-3-methyl-5-pyrazolone or 1-(3'-amino-2'-methyl-5'-sulfophenyl)-5-pyrazolone-3-carboxylic acid.

As phthalocyanine compounds of the formula (16) which are capable of coupling, there are mentioned, for example, compounds in which the radical K represents a radical of the benzene-, naphthalene-, pyrazolone- or acylacetic acid arylamide series which has a point capable of coupling. These compounds are prepared by methods known per se, for example by reacting phthalocyanine sulfonic acid chlorides of the type specified further above, with amines of the general formula (18)

in which K and $R_3$ have the meanings given above, and, if required, with amines of the general formula (13) as well as, if desired, while saponifying part of the sulfonic acid chloride groups simultaneously or subsequently.

As amines of the formula (18) there are used primary and secondary amines of the benzene-, naphthalene-, pyrazolone- or acylacetic acid arylamide series which have at least one point capable of coupling in the molecule, such as aminophenols, aminonaphthols, aminonaphthol-carboxylic acid amides, aminonaphtholsulfonic acids, aminoarylpyrazolones and acylacetic acid arylamides containing amino groups. Exemplary of such amines of the formula (18) are the following:

1-amino-3-hydroxybenzene, 1-amino-3-hydroxy-benzene-4-carboxylic acid, 1-amino-3-dimethylaminobenzene, 1-amino-7-hydroxynaphthalene, 2-amino-5hydroxynaphthalene-7-sulfonic acid, 2-amino-8-hydroxynaphthalene-6-sulfonic acid, 1-amino-8-hydroxynaphthalene-3,6-disulfonic acid, 1-(3'-aminophenyl)-3-methyl-5-pyrazolone, 1-(4'-aminophenyl)-3-methyl-5-pyrazolone, 1-(3'-amino-2'-methyl-5'-sulfophenyl)-3-methyl-5-pyrazolone, 1-(3'-aminophenyl)-5-pyrazolone-3-carboxylic acid, 1-(4'-amino-2',2''-disulfostilbene)-3-methyl-5-pyrazolone, 1-(4'-amino-2''-sulfodiphenyl)-3-methyl-5-pyrazolone.

As amines of the formula (17) there may be mentioned the following compounds: 1.3-diaminobenzene-4-sulfonic acid, 1,3-diaminobenzene-4-carboxylic acid, 1,4-diaminobenzene-3-sulfonic acid, 1,4-diaminobenzene-3-carboxylic acid, 1-amino-4-methylamino-benzene, 3-aminobenzylamine, 4-aminobenzylamine and 4-amino-benzylamine-disulfonic acid.

As acid chlorides of the formula Z—Cl which are used as reaction components for the process of the invention, there may be used the following compounds:
2,2,3,3-tetrafluorocyclobutane-carboxylic acid chloride-1, 2-chloro-2,3,3-trifluorocyclobutane-carboxylic acid chloride-1, 2,2-dichloro-3,3-difluorocyclobutane-carboxylic acid chloride-1, 1,2,2-trichloro-3,3-difluorocyclobutane-carboxylic acid chloride-1, 1-chloro-2,2,3,3-tetrafluorocyclobutane-carboxylic acid chloride-1, 4,4-dimethyl-2,2,3,3-tetrafluorocyclobutane-carboxylic acid chloride-1, 4-vinyl-2,2,3,3-tetrafluorocyclobutane-carboxylic acid chloride-1, 2-chloro-3,3-difluorocyclobutene- 1-carboxylic acid chlorice-1, 4-ethyl-2,2,3,3-tetrafluorocyclobutene-1,4-carboxylic acid chloride-1, 3-(2', 2', 3', 3'2'-tetrafluorocyclobutyl)-acrylic acid chloride, 3-(2'-chloro-2', 3', 3'-trifluorocyclobutyl)-acrylic acid chloride, 3-(2', 2'-dichloro-3', 3'-difluorocyclobutyl)-acrylic acid chloride, 3-(2', 2'-dichloro-3', 3'-difluoro-4'-methylcyclobutyl)-acrylic acid chloride, 3-(4'-methyl-2', 2', 3', 3'-tetrafluorocyclobulyl)-acrylic acid chloride.

The compounds of the general formula Z—Cl to be reacted according to the invention may be prepared by reacting unsaturated nitriles with halogenated olefins, such as tetrafluoroethylene, trifluoro-chloro-ethylene, 1,1-difluoro-2,2-dichloroethylene or trifluoroethylene, at elevated temperature and under pressure; by subsequently saponifying the nitriles obtained in an acid medium under known conditions and then converting them into the corresponding acid chlorides. It is also possible to react unsaturated carboxylic acids with halogenated olefins or acid chlorides of unsaturated carboxylic acid with halogenated olefins (cf. U.S. Pat. Nos. 2,441,128 and 2,462,345).

For carrying out the process of the invention in an aqueous or aqueous-organic medium, it is advantageous to use as acid-binding agents hydroxides, carbonates or hydrogenocarbonates, secondary or tertiary phosphates, borates or acetates of metals of the elements of groups 1 to 3 of the Periodic Table, preferably the sodium compounds. For a reaction in an organic medium tertiary organic bases, for example dimethylaniline, pyridine or picolines, are preferably used as acid-binding agents.

The process of the invention may also be carried out above or below the indicated temperature range; however, lower temperatures necessitate longer reaction periods and higher temperatures provide poorer yields. The optimum temperature to be applied in each individual case will depend on the reaction components used.

It is also possible to carry out the process at a pH-value inferior to the lower limit of the indicated range, whereby a poorer yield is, however, obtained.

The novel azophthalocyanine dyestuffs of the formula (1) may be finally prepared by condensing phthalocyanine sulfonic acid chlorides of the formula (19)

$$Pc-(SO_2Cl)_m \qquad (19)$$

in which Pc has the meaning given further above and $m$ is an integer of from 2 to 4, with amino-azo dyestuffs of the formula (20)

(20)

in which A, $R_3$, $R_4$ and Z have the meanings given further above, and, if desired with amines of the formula (21)

(21)

in which $R_1$ and $R_2$ have the meanings given further above, at temperatures in the range of from about 0° C. to about 30° C., in an aqueous, aqueous-organic or organic medium within a pH-range of from about 2 to about 10 in the presence of an acid-binding agent and saponifying sulfonic acid chloride groups that may not have been reacted.

As phthalocyanine sulfonic acid chlorides to be used as starting compounds for the process of the present invention, there may be mentioned sulfonic acid chlorides of metal-free phthalocyanine; preferably sulfonic acid chlorides of metal-containing phthalocyanines, for example, copper-phthalocyanine-(3)-tetrasulfonic acid chloride, copper-phthalocyanine-(3)-trisulfonic acid chloride, copper-phthalocyanine-(3)-disulfonic acid chloride, nickel-phthalocyanine-(3)-tetrasulfonic acid chloride, cobalt-phthalocyanine-(3)-trisulfonic acid chloride, copper-phthalocyanine-(4)-disulfonic acid chloride or copper-phthalocyanine-(4)-tetrasulfonic acid chloride. Sulfonic acid chlorides which carry further substituents at the phthalocyanine nucleus, for example sulfonic acid chlorides of tetraphenyl-copper-phthalocyanine or tetrachloro-nickel-phthalocyanine or copper-phthalocyanine-(3)-disulfonic acid chloride disulfonic acid, are also appropriate. The specified sulfonic acid chlorides are prepared by known methods, for example by the process disclosed in German Pat. No. 891,121.

The amino-azo dyestuffs of the formula (20) which are suitable as starting compounds for this process, contain an amino group that can be acylated and renders them capable of reacting with the phthalocyanine sulfonic acid chlorides, and a group Z. The amino group that can be acylated may be contained in the diazo component of the azo dyestuff whereas the group Z is in the coupling component. Conversely, the group Z may also be contained in the diazo component while the amino group that can be acylated is in the coupling component. Finally it is also possible for both groups to be contained in one component of the azo dyestuff, for example in the coupling component. The specified amino-azo dyestuffs are prepared by methods generally known for the preparation of such dyestuffs.

Exemplary of amines of the formula (21) to be used as starting compounds for the process of the present invention, are the following compounds:
Ammonia, methylamine, ethylamine, n-butylamine, benzylamine, aniline, ethanolamine, dimethylamine, diethylamine, diisopropylamine, N-methylbenzylamine, N-methylaniline, piperidine, morpholine, diethanolamine, 2-aminoethane-1-sulfonic acid, 2-aminoethane-1-carboxylic acid, 4-aminobenzene-carboxylic acid, 3-aminopenzene-sulfonic acid or 4-amino benzene-sulfonic acid.

The process of the invention may also be carried out above or below the indicated temperature range; however, lower temperatures necessitate longer reaction periods and higher temperatures provide poorer yields. The optimum temperature to be applied in each individual case will depend on the reaction components used.

It is also possible to carry out the process at a pH-value inferior to the lower limit of the indicated range, whereby a poorer yield is, however, obtained.

For carrying out the process in an aqueous, aqueous-organic or organic medium, it is advantageous to use as acid-binding agents hydroxides, carbonates or hydrogenocarbonates, secondary or tertiary phosphates, borates or acetates of metals of the elements of groups 1 to 3 of the Periodic Table, preferably the sodium compounds, or tertiary organic bases, for example dimethlaniline, pyridine or picolines.

The starting compounds necessary for carrying out the process of the invention are advantageously chosen in such a manner that the azophthalocyanine dyestuffs of the general formula (1) obtained contain such a number of water-solubilizing groups, for example sulfonic acid- and/or carboxylic acid groups, as is necessary to achieve sufficient solubility in water.

The azophthalocyanine dyestuffs obtainable by the three methods mentioned above are isolated by salting them out, for example, with sodium or potassium chloride and/or by acidifying them with a mineral acid or by concentrating the neutral aqueous dyestuff solutions by evaporation, preferably at moderately elevated temperature and under reduced pressure.

The novel azophthalocyanine dyestuffs obtainable by the three above methods are suitable for dyeing and printing various materials, for example wool, silk, leather and linear polyamides, especially materials of fibrous structure which contain hydroxyl groups, for example linen, regenerated cellulose and, above all, cotton.

The dyeings are prepared, for example, by direct dyeing from a dyebath containing agents having an alkaline action and, if desired inorganic salts, for example alkali metal chlorides or alkali metal sulfates, at room temperature or at elevated temperature, for example in the range of from about 50° to 100° C.

If the dyestuffs applied have no, or only a weak, affinity to the fiber, it is advantageous to impregnate the fibrous material in the could or at a moderate temperature with the aqueous solutions of the dyestuffs which may contain agents having an alkaline action, or inorganic salts, to squeeze off the material and to fix the dyestuffs applied, if desired after intermediate drying.

If the padding liquor used contains an agent having an alkaline action, fixing is effected, for example, by steam treatment, thermofixing or allowing the impregnated material to dwell for several hours. The fixing method chosen depends on the type and amount of the alkali used.

When impregnating baths that do not contain an agent having an alkaline action, are used, the impregnated material is then introduced, for example, into an alkaline bath containing salts and then subjected to one of the above fixing methods.

As agents having an alkaline action, there are preferably used alkali metal hydroxides, alkali metal carbonates and bicarbonates, alkali metal phosphates, , alkali metal borates or alkali metal silicates or the alkali metal salts of trichloro-acetic acid or mixtures of the above compounds.

For use in textile printing the novel dyestuffs are dissolved in water, if desired with the addition of usual adjuvants, for example urea or dispersing agents, and then mixed with thickening agents, for example methyl cellulose or alginate-thickeners. Then the above-specified alkalies are added to the pastes thus obtained and the material is then printed in usual manner. Fixation is then effected by a steam treatment or thermofixation in known manner.

The fibrous material may, however, also be printed with neutral or weakly acid printing pastes that do not contain agents having an alkaline action. In this case, the fibrous material is treated with agents having an alkaline action, prior to or after printing, for example by passing it shortly through a salt-containing alkaline solution, and then it is subjected to one of the above fixing methods. In very simple manner, fixing may also be effected by passing the printed material through a hot salt-containing alkaline solution.

The novel dyestuffs provide on the above-specified materials very valuable intensive dyeings and prints which are distinguished by a very good fastness to wet processing and to light.

The following examples serve to illustrate the invention, but they are not intended to limit it thereto, the parts being by weight unless stated otherwise.

EXAMPLE 1

Twenty-one parts by volume of a 1N-sodium nitrite solution were added to a solution of 12.5 parts of the nickel-phthalocyanine compound of the formula

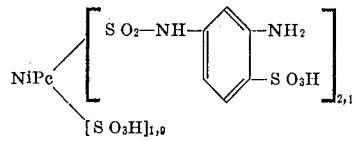

in 100 parts by volume of water and this mixture was slowly stirred into a mixture of 200 parts of crushed ice and 50 parts by volume of a 2N-hydrochloric acid so that the temperature did not exceed +10° C. The whole was stirred for half an hour below 10° C., a possible excess of nitrous acid was then destroyed by means of amido-sulfonic acid and then a neutral iced solution of 9 parts of 1-[m-($\beta$-2',2',3',3'-tetrafluoro-cyclobutyl-acryloylamino)-phenyl]-5-pyrazolone-3-carboxylic acid of the formula

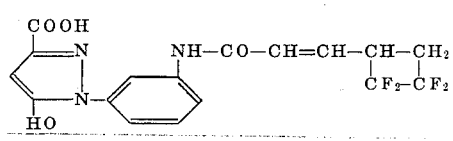

in 200 parts by volume of water and then five parts of crystallized sodium acetate were added thereto. When the coupling was complete and azo dyestuff formed was isolated by filtration and dried. There were obtained 39 parts of the salt-containing dyestuff that, applied from an alkaline bath, dyed cotton a green shade having a very good fastness to wet processing.

When, instead of the above-specified nickel-phthalocyanine compound, the diazotizable phthalocyanine derivatives indicated in the following table were used, azo-phthalocyanine dyestuffs having similar properties and yielding the shades indicated in the following table were obtained.

| Ex. No. | Diazo-component | Shade |
|---|---|---|
| 2 | CuPc$\diagup^{[SO_2-NH-\bigcirc-NH_2}_{-SO_3H}]_{2,2}$ $\diagdown[SO_3H]_{1,8}$ | Green. |
| 3 | NiPc$\diagup^{[SO_2-NH-\bigcirc-NH_2]_{2,2}}$ $\diagdown[SO_3H]_{1,8}$ | Do. |
| 4 | NiPc$\diagup^{[SO_2-NH-\bigcirc^{-NH_2}_{-CH_3}]_{2,2}}$ $\diagdown[SO_3H]_{1,8}$ | Do. |

| Ex. No. | Diazo-component | Shade |
|---|---|---|
| 5 | 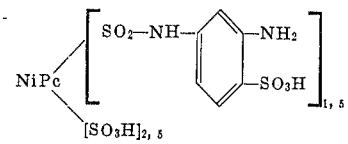 | Do. |
| 6 | 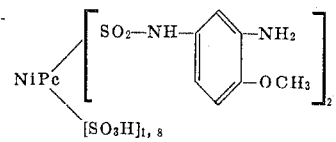 | Do. |
| 7 | 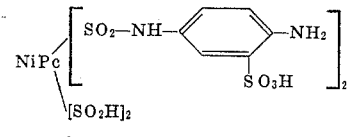 | Olive. |
| 8 | 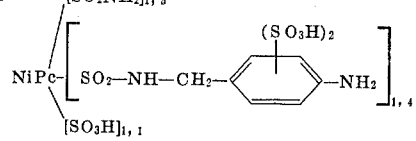 | Blue-green. |
| 9 | 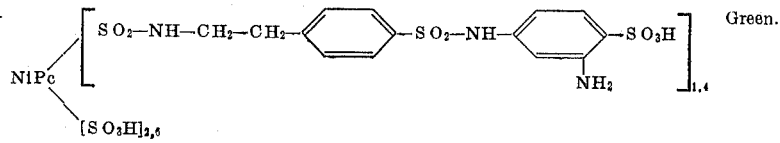 | Green. |
| 10 | 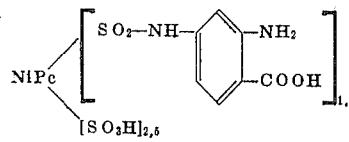 | Do. |
| 11 | 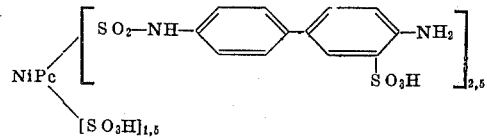 | Olive. |
| 12 | 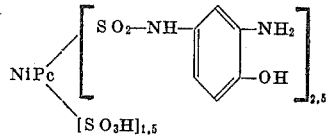 | Grey-green. |
| 13 | 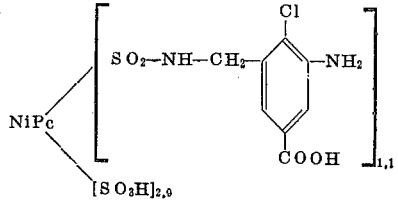 | Green. |
| 14 | 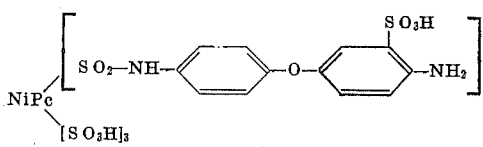 | Do. |
| 15 | 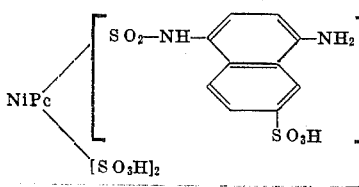 | Grey-green. |

| Ex. No. | Diazo-component | Shade |
|---|---|---|
| 16 | NiPc—[SO₂—NH—C₆H₃(SO₃H)—CH=CH—C₆H₃(SO₃H)—NH₂]₁.₅ —[SO₃H]₂.₅ | Olive. |
| 17 | NiPc—[SO₂—NH—C₆H₂(CH₃)(SO₃H)—NH—CO—C₆H₄—NH₂]₁.₆ —[SO₃H]₂.₄ | Green. |
| 18 | NiPc—[SO₂—NH—C₆H₂(CH₃)(SO₃H)—NH₂]₁ —[SO₃H]₂ | Do. |
| 19 | CuPc—[SO₂—NH₂]₁—[SO₂—NH—C₆H₃(SO₃H)—NH₂]₂—[SO₃H]₁ | Do. |
| 20 | NiPc—[SO₂—N(CH₃)₂]₁—[SO₂—NH—C₆H₃(SO₃H)(NH₂)]₁—[SO₃H]₂ | Do. |
| 21 | CuPc—[SO₂—NH—CH₂—CH₂—NH—C₆H₃(SO₃H)—NH₂]₄ | Do. |
| 22 | NiPc—[SO₂—NH—C₆H₃(NH₂)(SO₃H)]₄ | Do. |
| 23 | NiPc—[SO₂—NH—CH₂—CH₂—NH—C₃N₃(NH—C₆H₃(NH₂)(SO₃H))(NH—C₆H₄—SO₃H)]₂—[SO₃H]₂ | Do. |

| Ex. No. | Diazo-component | Shade |
|---|---|---|
| 24 | $CoPc\begin{bmatrix}SO_2-NH-\underset{SO_3H}{\underset{|}{C_6H_4}}-NH_2\end{bmatrix}_{2.1}[SO_3H]_{1.9}$ | Do. |
| 25 | $CuPc\begin{bmatrix}SO_2-NH-\underset{SO_3H}{\underset{|}{C_6H_4}}-NH_2\end{bmatrix}_{1.2}[SO_3H]_1$ | Do. |
| 26 | $NiPc\begin{bmatrix}SO_2-NH-\underset{SO_3H}{\underset{|}{C_6H_4}}-NH_2\end{bmatrix}_1[SO_3H]_1$ | Do. |

EXAMPLE 27

Twenty-two parts by volume of a 1N-sodium nitrite solution were added to a solution of 10.9 parts of the nickel-phthalocyanine compound of the formula

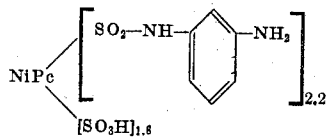

in 50 parts by volume of water and five parts by volume of a 33 percent sodium hydroxide solution and this mixture was slowly stirred into an introduced mixture of 150 parts of crushed ice and 10 parts by volume of concentrated hydrochloric acid so that the temperature did not exceed +10° C. The whole was stirred for half an hour below 10° C., a possible excess of nitrous acid was then destroyed by means of amidosulfonic acid and then a neutral iced solution of 11.6 g. of 1-(β-2',2',3',3'-tetrafluorocyclobutyl-acryloylamino)-8-hydroxy-naphthalene-3,6-disulfonic acid of the formula

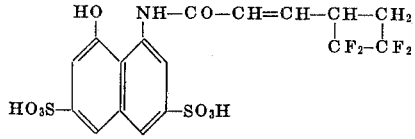

in 100 parts by volume of water and then 10 parts of crystallized sodium acetate were added thereto. When the coupling was complete the azo dyestuff formed was salted out with sodium chloride, isolated by filtration and dried. There were obtained 59 parts of the salt-containing dyestuff which in the presence of agents having an alkaline action, dyed cotton violet shades having a very good fastness to wet processing.

When in the above example, instead of 1-(β-2',2',3',3'-tetrafluorocyclobutyl-acryloylamino)-8-hydroxynaphthalene-3,6-disulfonic acid, the coupling components mentioned in the following table were used, azo-phthalocyanine dyestuffs having similar properties and yielding the shades mentioned in the following table were obtained.

| Ex. No. | Coupling component | Shade |
|---|---|---|
| 28 | $HO_3S-\underset{}{C_{10}H_5}(OH)-NH-CO-CH=CH-\underset{CF_2-CF_2}{\underset{|}{CH}}-CH_2$ | Grey. |
| 29 | $HO_3S-\underset{}{C_{10}H_5}(OH)-NH-CO-CH=CH-\underset{CF_2-CF_2}{\underset{|}{CH}}-CH_2$ | Blue-grey. |
| 30 | $HOOC-\underset{HO}{C_3HN_2}-C_6H_4-NH-CO-\underset{CCl_2-CF_2}{\underset{|}{CH}}-CH_2$ | Green. |
| 31 | $HO_3S-\underset{}{C_{10}H_5}(OH)-NH-CO-\underset{CCl_2-CF_2}{\underset{|}{CCl}}-CH_2$ | Grey. |

| Ex. No. | Coupling component | Shade |
|---|---|---|
| 32 | 3-carboxy-5-hydroxy-1-[4-(NH-CO-CH=CH-CH(CF$_2$-CF$_2$)-CH$_2$)phenyl]pyrazole | Green. |
| 33 | 1-hydroxy-6-sulfo-naphthalene with 2-N(CH$_3$)-CO-CH(CCl$_2$-CF$_2$)-CH$_2$ | Grey. |
| 34 | 1-hydroxy-8-(NH-CO-C(CCl-CF$_2$)—CH$_2$)-naphthalene-3,6-disulfonic acid | Violet. |
| 35 | 3-carboxy-5-hydroxy-1-[3-(NH-CO-CH=CH-CH(CH$_3$)-CF$_2$-CF$_2$)phenyl]pyrazole | Green. |
| 36 | 3-carboxy-5-hydroxy-1-[4-(NH-CO-CH-CH(CF$_2$-CF$_2$)-CH=CH$_2$)phenyl]pyrazole | Do. |
| 37 | 1-hydroxy-8-(NH-CO-CCl-CH$_2$-CF$_2$-CF$_2$)-naphthalene-3,6-disulfonic acid | Violet. |
| 38 | 1-hydroxy-8-(NH-CO-CH-CH$_2$-CFCl-CF$_2$)-naphthalene-3,6-disulfonic acid | Do. |
| 39 | 3-carboxy-5-hydroxy-1-[4-(NH-CO-C(CH$_3$)-CH$_2$-CCl$_2$-CF$_2$)phenyl]pyrazole | Green. |
| 40 | 1-hydroxy-6-sulfo-naphthalene with 2-N(CH$_3$)-CO-CH-C(CH$_3$)$_2$-CF$_2$-CF$_2$ | Grey. |
| 41 | 1-hydroxy-8-(NH-CO-CH-CH(C$_6$H$_5$)-CF$_2$-CF$_2$)-naphthalene-3,6-disulfonic acid | Violet. |

EXAMPLE 42

19.7 parts of 1,3-diaminobenzene-4-sulfonic acid in 400 parts by volume of water were adjusted to a pH of 8 by adding an aqueous 2N sodium carbonate solution. At room temperature a solution of 25 parts of β-(2,2,3,3-tetrafluorocyclobutyl)-acrylic acid chloride in 50 parts by volume of acetone was added thereto dropwise and by simultaneously adding a 2N sodium carbonate solution the pH value was maintained within the range of from 5.3 to 5.8. When the reaction was complete 400 parts by volume of water and 52.5 parts by volume of 2N sodium nitrite solution were added thereto, the whole was heated to complete decomposition, the solution obtained was added dropwise to a mixture of 25 parts by volume of concentrated hydrochloric acid and about 1200 parts of ice while cooling so that the temperature did not exceed 3° C. and the whole was stirred for several hours while cooling with ice.

The diazo suspension thus prepared was allowed to flow slowly into a solution which had been adjusted to pH 8 by means of sodium hydroxide solution and which consisted of 64.6 parts of the phthalocyanine compound of the formula

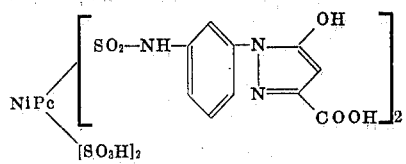

in 600 parts by volume of water and at the same time a 2N sodium carbonate solution was added in such a manner that pH-value within the range of from 6.5 to 7 was maintained. When coupling was complete the dyestuff obtained was isolated by salting out and dried. There were obtained 150 parts of the dyestuff which in the presence of agents having alkaline action dyed cotton fabrics brilliant green shades.

Similar dyestuffs were obtained using instead of the above-mentioned coupling components, the components indicated in the following table:

| Ex. No. | Coupling component | Shade |
|---|---|---|
| 43 | NiPc[SO₂—NH—C₆H₄—pyrazole(OH)(CH₃)]₁,₅ [SO₃H]₁,₅ | Green. |
| 44 | NiPc[SO₂—NH—C₆H₃(OH)—COOH]₂ [SO₃H]₂ | Do. |
| 45 | NiPc[SO₂—NH—C₆H₄—NH—CO—CH₂—CO—CH₃]₂,₂ [SO₃H]₁,₈ | Blue-green. |
| 46 | NiPc[SO₂—NH—C₆H₃(SO₃H)—NH—CO—CH₂—CO—CH₃]₂,₁ [SO₃H]₁,₉ | Do. |
| 47 | NiPc[SO₂—NH—C₆H₄—pyrazole(COOH)(OH)]₂ [SO₃H]₂ | Green. |
| 48 | NiPc-[SO₂NH₂]₁ [SO₂—NH—C₆H₃(COOH)—NH—CO—CH₂—CO—CH]₁,₅ [SO₃H]₁,₅ | Blue-green. |
| 49 | CuPc[SO₂—NH—naphthyl(OH)(SO₃H)]₂ [SO₃H]₂ | Grey. |
| 50 | NiPc—[SO₂—NH—C₆H₄—pyrazole(CH₃)(OH)]₄ | Green. |
| 51 | CuPc—[SO₂—NH—C₆H₃(COOH)—NH—CO—CH₂—CO—CH₃]₄ | Blue-green. |

| Ex. No. | Coupling component | Shade |
|---|---|---|
| 52 | NiPc[...][SO₃H]₂ (structure with SO₂—NH—phenyl(CH₃)—pyrazolone(CH₃, OH, SO₃H))₁.₅ | Green. |
| 53 | NiPc[SO₃H]₁.₅ (structure with SO₂—NH—phenyl(SO₃H)—CH=CH—phenyl(HO₃S)—pyrazolone(CH₃, OH))₁.₅ | Olive. |
| 54 | NiPc[SO₃H]₂.₅ (structure with SO₂—NH—biphenyl(HO₃S)—pyrazolone(COOH, OH))₁.₅ | Do. |
| 55 | NiPc[SO₃H]₁.₃ (structure with SO₂—NH—phenyl—pyrazolone(COOH, OH))₁.₅ and (SO₂—NH(C₂H₅)₂)₁.₂ | Green. |

EXAMPLE 56

Sixteen parts of 1,3-diaminobenzene-4-carboxylic acid were acylated in the manner described in the first paragraph of example 41 with β-(2,2,3,3-tetrafluorocyclobutyl)-acrylic acid-chloride and the acylation product obtained was diazotized in the manner disclosed in example 41 and then coupled with 64.6 parts of the phthalocyanine compound of the formula indicated in example 41. After isolation and drying there were obtained 145 parts of a salt-containing green dyestuff of the following formula:

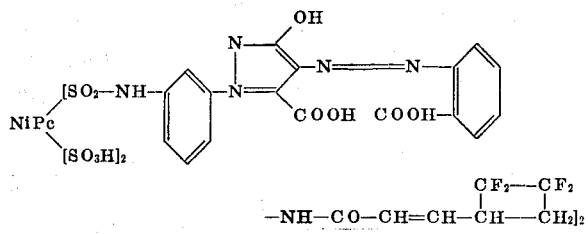

$$-NH-CO-CH=CH-\overset{CF_2—CF_2}{\underset{}{CH—CH_2}}]_2$$

The dyestuff was soluble in water giving a yellow-green shade and yielded on cotton fabrics in the presence of agents having an alkaline action, dyeings and prints of good fastness properties. Dyestuffs having similar properties were obtained when using instead of the above mentioned diazo components equivalent amounts of the compounds indicated in the following table:

| Ex. No. | Diazo component | Shade |
|---|---|---|
| 57 |  | Green. |

| Ex. No. | Diazo-component | Shade |
|---|---|---|
| 58 | H₂N—C₆H₃(HO₃S)(CH₃)—NH—CO—C(Cl)(CH₂—CF₂)—CCl₂ | Do. |
| 59 | H₂N—C₆H₃(CH₃)(SO₃H)—NH—CO—C(=C—Cl)(CH₂—CF₂) | Do. |
| 60 | H₂N—C₆H₃(CH₃)(SO₃H)—NH—CO—CH(CH₂—CF₂)—CCl₂ | Do. |
| 61 | H₂N—C₆H₃(Cl)(SO₃H)—NH—CO—C(=CCl)(CH₂—CF₂) | Do. |
| 62 | H₂N—C₆H₃(HO₂S)(NO₂)—NH—CO—C(Cl)(CH₂—CF₂)—CCl₂ | Do. |
| 63 | H₂N—C₆H₃(SO₃H)(Cl)—NH—CO—CH(CH₂—CF₂)—CCl₂ | Do. |
| 64 | H₂N—C₆H₃(SO₂H)₂—CH₂—NH—CO—CH=CH—CH(CH₂—CF₂)—CF₂ | Do. |

EXAMPLE 65

Forty-two parts by volume of a 1N sodium nitrite solution were added to a solution of 25 parts of the nickel-phthalocyanine compound of the formula

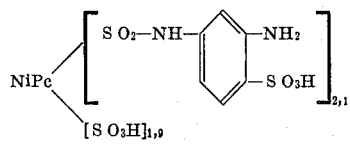

in 200 parts by volume of water and 20 parts by volume of a 2N sodium hydroxide solution and this mixture was slowly stirred into a mixture of 400 parts of crushed ice and 100 parts by volume of a 2N hydrochloric acid so that the temperature did not exceed +10° C. The whole was stirred for half an hour below 10° C. and then a possible excess of nitrous acid was destroyed by means of amidosulfonic acid. A solution of 4.7 parts of 3-aminotoluene in 22 parts by volume of a 2N hydrochloric acid and 50 parts of water and then 20 parts of sodium acetate were added thereto. As soon as the coupling was complete, the dyestuff formed was filtered off and washed with dilute sodium chloride solution until free from the excess of 3-aminotoluene.

The moist filter residue was dissolved in 250 parts of water by adding 19 parts by volume of a 2N sodium hydroxide solution until neutral reaction occurred. Below 5° C. 15 parts of 3-(2',2',3',3'-tetrafluorocyclobutyl)-acrylicacid chloride were added dropwise to this solution while maintaining a pH within the range of from 5.3–5.7 by simultaneously adding crystallized sodium acetate. When the reaction was complete, the dyestuff was separated by adding potassium chloride, filtered off, washed with saturated potassium chloride solution and dried. There were obtained 37 parts of the salt-containing green dyestuff which applied from an alkaline bath dyed cotton a green shade having a very good fastness to wet processing.

When in the above example instead of 3-amino-toluene equivalent amounts of 1-amino-3-methoxybenzene, 1-amino-3-methyl-6-methoxybenzene, 1-amino-3-acztoaminobenzene, 3-aminophenyl-urea, 1-amino-naphthalene-6-sulfonic acid, 2-amino-8-hydroxynaphthalene-6-sulfonic acid, 2-amino-5-hydroxynaphthalene-7-sulfonic acid, or 1-amino-8-hydroxynaphthalene-3,6-disulfonic acid were used, dyestuffs having similar properties were obtained.

EXAMPLE 66

14.5 parts of the azophthalocyanine dyestuff of the formula

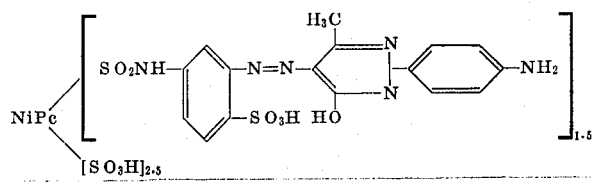

were dissolved in 400 parts of water while adding a sodium hydroxide solution. The pH of the solution was adjusted to 6 by adding acetic acid. After cooling at a temperature below 5° C., 98 parts of 3-(2',2',3',3'-tetrafluorocyclobutyl)-acrylic acid chloride were added dropwise to this mixture and the pH-value was maintained within the range of from 5.5 to 6 by simultaneously adding sodium hydrogen carbonate. When the reaction was complete the dyestuff formed was completely separated by adding sodium chloride, filtered off, washed with sodium chloride solution and dried. There were obtained 24 parts of the salt-containing green dyestuff which, applied from an alkaline bath, dyed cotton a green shade having very good fastness to wet processing.

Dyestuffs having similar properties were obtained when using instead of 3-(2',2',3',3'-tetrafluorocyclobutyl)-acrylic acid chloride equivalent amounts of the following acid chlorides:
2,2,3,3-tetrafluorocyclobutane-carboxylic acid chloride-1)2-chloro-2,3,3-trifluorocyclobutane-carboxylic acid chloride-1,2,2-dichloro-3,3-difluorocyclobutane-carboxylic acid chloride-1,1,2,2-trichloro-3,3-difluorocyclobutane-carboxylic acid chloride-1,
1-chloro-2,2,3,3-tetrafluorocyclobutane-carboxylic acid chloride-1,
1-methyl-2,2,3,3-tetrafluorocyclobutane-carboxylic acid chloride-1,
4,4-dimethyl-2,2,3,3-tetrafluorocyclobutane-carboxylic acid chloride-1,
4-vinyl-2,2,3,3-tetrafluorocyclobutane-carboxylic acid chloride-1,
2-chloro-3,3-difluoro-cyclobutene-1-carboxylic acid chloride-1,4-ethyl-2,2,3,3-tetrafluorocyclobutene-1,4-carboxylic acid chloride-1,
3-(2',2',3',3'-tetrafluorocyclobutyl)-acrylic acid chloride, 3-(2'-chloro-2',3',3'-trifluorocyclobutyl)-acrylic acid chloride,
3-(2',2'-dichloro-3',3'-difluorocyclobutyl)-acrylic acid chloride,
3-(2',2'-dichloro-3',3'-difluoro-4'-methylcyclobutyl)-acrylic acid chloride,
3-(4'-methyl-2',2',3',3'-tetrafluorocyclobutyl)-acrylic acid chloride.

EXAMPLE 67

27.4 parts of the azo-phthalocyanine dyestuff of the formula

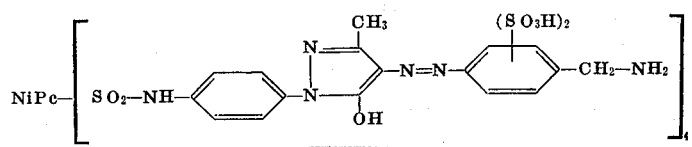

prepared by coupling diazotized 4-aminobenzyl-amino-disulfonic acid with a condensation product of nickel-phthalocyanine(3)-tetrasulfonic acid chloride and 4 mols of 1-(4'-amino-phenyl)-3-methyl-5-pyrazolone, were dissolved in 500 parts of water while adding a sodium hydroxide solution. The pH of the solution was adjusted to 7.5 by adding acetic acid, below 5° C. 26 parts of 3-(2',2',3',3'-tetrafluorocyclobutyl)-acrylic acid chloride were added dropwise to this mixture while maintaining the pH within the range of 7–7.5 by simultaneously adding sodium hydrogen carbonate. When the reaction was complete the dyestuff obtained was completely separated by adding sodium chloride, filtered off, washed with a sodium chloride solution and dried. The yield amounted to 42 parts of this salt-containing green dyestuff which, applied from an alkaline bath, dyed cotton and regenerated cellulose green shades having very good fastness to wet processing.

Reactive azo-phthalocyanine dyestuff having similar properties and yielding the shades indicated were obtained using in the above example, instead of the azo-phthalocyanine dyestuff containing amino groups and corresponding to the above-indicated formula, the azo-phthalocyanine dyestuffs containing amino groups indicated in the following table:

| Ex. No. | Azophthalocyanine dyestuff | Shade |
|---|---|---|
| 68 | | Green. |
| 69 | | Do. |
| 70 | | Grey green. |

| Ex. No. | Azophthalocyanine dyestuff | Shade |
|---|---|---|
| 71 | 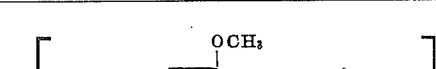 | Green. |
| 72 | 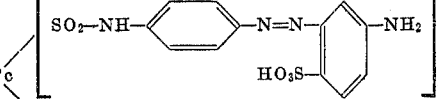 | Do. |

EXAMPLE 73

Twelve parts of the aminoazo dyestuff of the formula

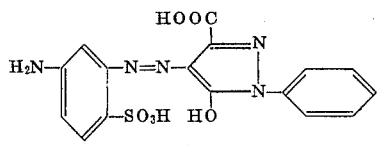

—NH—CO—CH=CH—CH—CH₂ (with CF₂—CF₂ bridge)

were dissolved in 200 parts by volume of water while adding a sodium hydroxide solution until neutral reaction occurred. 9.65 parts of nickel-phthalocyanine-(3)-tetrasulfonic acid chloride were added to this solution in the form of a moist filter cake, one part by volume of pyridine was added thereto and the pH-value was maintained within a range of some 6.5 to 7.5 during the reaction which set in, by adding sodium hydrogen carbonate. When the condensation was complete and the pH-value did not change anymore, the azo-phthalocyanine dyestuff formed was separated by salting out, filtered off, washed free from starting dyestuff and dried. There were obtained 30 g. of a salt-containing green dyestuff which in the presence of agents having an alkaline action dyed cotton fabrics clear green shades.

EXAMPLE 74

9.7 parts of nickel-phthalocyanine-(3)-tetrasulfonic acid chloride were introduced in the form of a moist filter cake into a neutral solution of 19.5 parts of diaminoazo dyestuff of the formula

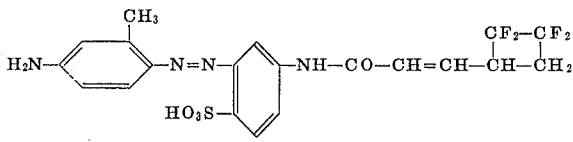

in 750 parts of water. One part by volume of pyridine was added thereto and the pH-value of the reaction mixture was maintained within the range of from 7–7.5 during the reaction which set in, by adding sodium bicarbonate. When the condensation was complete the azo-phthalocyanine dyestuff formed was completely separated by salting out, filtered off, washed free from the starting dyestuff and dried. There were obtained 35 parts of salt-containing green dyestuff which in the presence of agents having an alkaline action dyed cotton fabrics fast green shades.

Dyestuffs having similar properties were obtained using in the above example instead of the above-mentioned aminoazo dyestuff, equivalent amounts of the following dyestuffs:

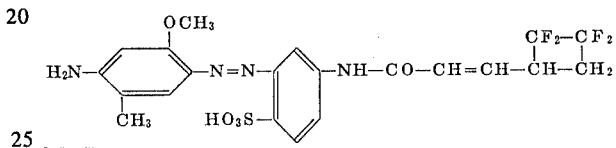

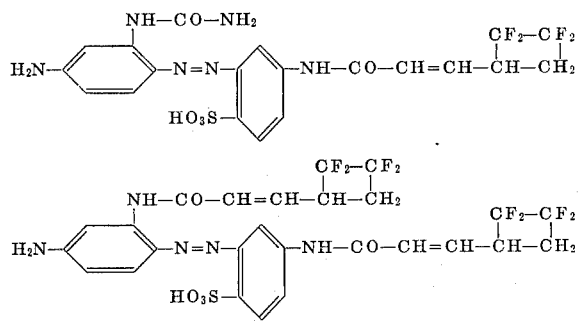

EXAMPLE 75

9.7 parts of nickel-phthalocyanine-(3)-tetrasulfonic acid chloride were introduced in the form of a moist filter cake into a neutral solution of 22.1 parts of the aminoazo dyestuff of the formula

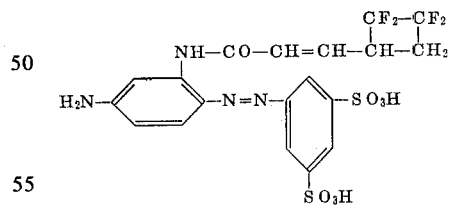

in 600 parts of water. One part by volume of pyridine was then added thereto and in the course of the condensation the pH value of the reaction mixture was maintained within the range of from 7–7.5 by adding dropwise 2N aqueous amonia. When the reaction was complete the azo-phthalocyanine dyestuff was completely separated by salting out, filtered off, washed free from the starting dyestuff and dried. There were obtained 36 parts of a salt-containing green dyestuff which in the presence of agents having an alkaline action dyed cotton fabrics fast green shades.

Dyestuffs having similar properties were obtained using in the above example, instead of nickel-phthalocyanine-(3)-tetrasulfonic acid chloride, equivalent amounts of nickel-phthalocyanine-(3)-trisulfonic acid chloride, copper-phthalocyanine-(3)-tetrasulfonic acid chloride, copper-phthalocyanine-(3)-trisulfonic acid chloride, copper-phthalocyanine-(3)-disulfonic acid chloride or copper-phthalocyanine-(4)-tetrasulfonic acid chloride.

EXAMPLE 76

Twenty-one parts by volume of a 1N sodium nitrite solution were added to a solution of 12.5 parts of nickel -phthalocyanine-compound of the formula

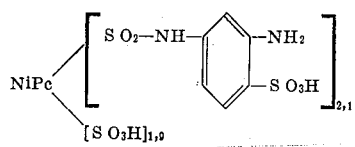

in 100 parts by volume of water and 10 parts by volume of a 2N sodium hydroxide solution and the mixture was slowly stirred into a mixture of 200 parts of crushed ice and 50 parts by volume of a 2N hydrochloric acid so that the temperature did not exceed +10° C.

Then an iced solution of 6.9 parts of dihydrochloride of the compound of the formula

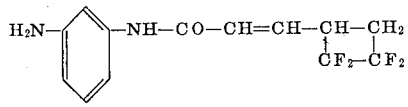

in 150 parts by volume of water was added thereto and coupling was effected at a pH-value of 3 which had been adjusted and maintained with sodium carbonate. When the coupling reaction was complete the azo-phthalocyanine dyestuff obtained of the formula

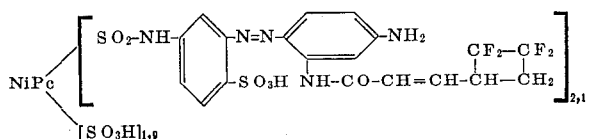

was completely precipitated by adding hydrochloric acid and then filtered off. The moist filter residue was dissolved in 250 parts of water while adding sodium bicarbonate until neutral reaction occurred. From this solution the dyestuff was salted out with sodium chloride, filtered off and dried. There were obtained 38.5 parts of a salt-containing dyestuff which, applied on cotton and regenerated cellulose in the presence of acid-binding agents yielded brilliant, yellowish-green dyeings and prints of good fastness to washing.

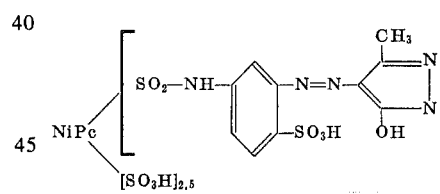

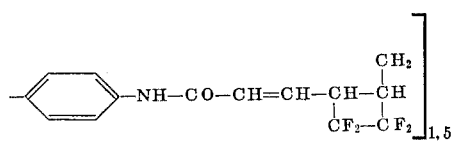

We claim:

1. A water-soluble azo-phthalocyanine dyestuff of the formula

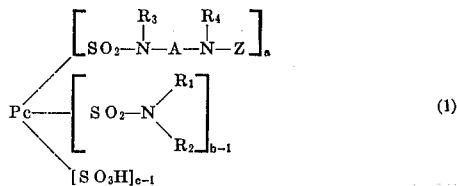

in which Pc represents copper phthalocyanine cobalt phythalocyanine or nickel phthalocyanine, A represents —D—N N—K— or —K—N=N—D—, wherein D as the radical of a diazo component stands for phenylene, monosulfophenylene, lower alkyl-phenylene, lower alkoxy-phenylene, carboxy-phenylene, hydroxy-phenylene, monosulfo-lower alkoxy-phenylene, monosulfo-chloro-phenylene, monosulfo-nitro-phenylene, disulfo-phenylene, benzylene, chloro-carboxy-benzylene, disulfo-benzylene, monosulfo-naphthylene,

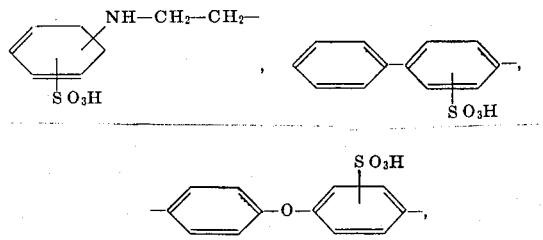

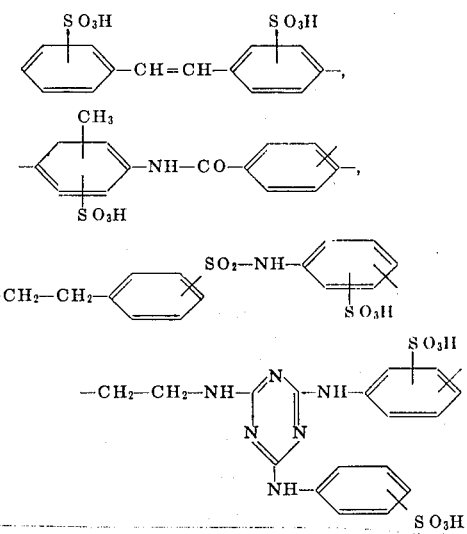

and K as the radical of a coupling component stands for amino-phenylene, lower alkoxy-phenylene, lower alkyl-phenylene, lower alkyl-lower alkoxy-phenylene, hydroxy-carboxy-phenylene, carbamido-phenylene, acetylamino-phenylene, monosulfonaphthylene, monosulfo-hydroxy-phenylene, disulfo-hydroxy-phenylene,

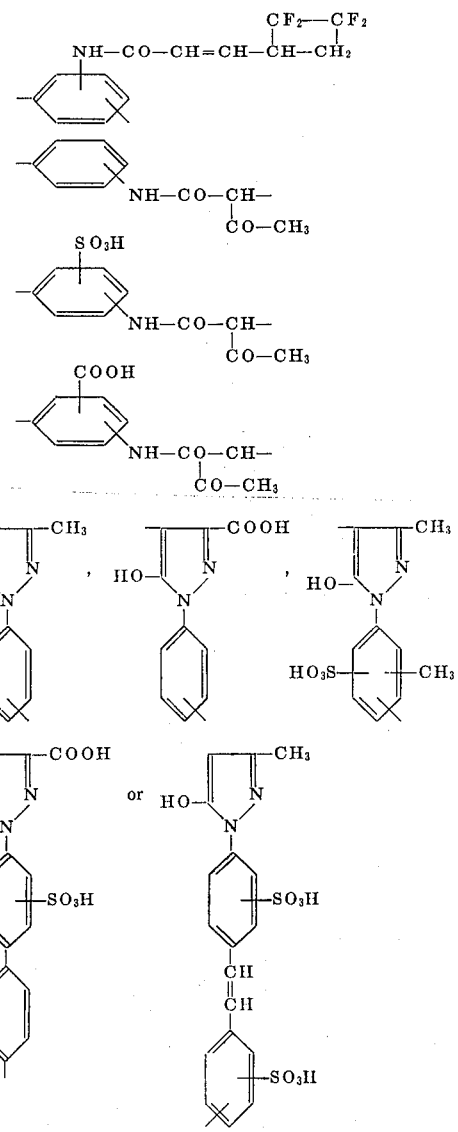

$R_1$ and $R_2$ represent hydrogen or lower alkyl, $R_3$ and $R_4$ represent hydrogen or lower alkyl $a, b$ and $c$ represent integers from 1 to 4, the sum of $a, b$ and $c$ being at most 6, Z stands for the grouping of the formula

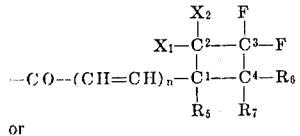
(2)

or

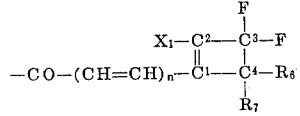
(3)

wherein $R_5$ represents hydrogen, lower alkyl or chlorine, $R_6$ and $R_7$ represent hydrogen, lower alkyl, vinyl or phenyl, $X_1$ and $X_2$ represent chlorine or fluorine, and $n$ stands for the integer 0 or 1.

2. The dyestuff of the formula

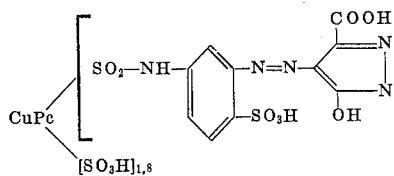

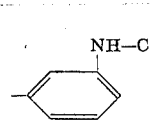

3. The dyestuff of the formula

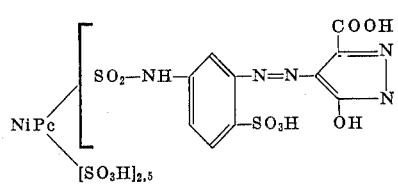

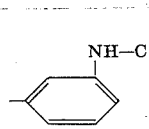

4. The dyestuff of the formula

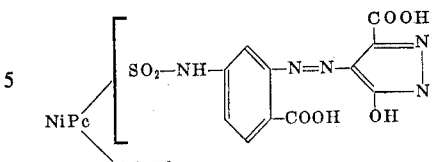

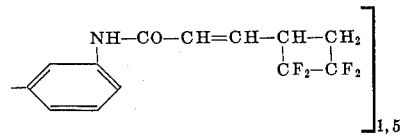

5. The dyestuff of the formula

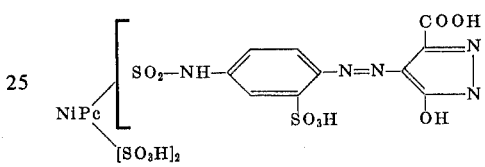

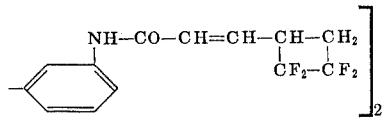

6. The dyestuff of the formula